US011377223B2

(12) United States Patent
Zingaro et al.

(10) Patent No.: US 11,377,223 B2
(45) Date of Patent: Jul. 5, 2022

(54) AUTOTHROTTLE CONTROL SYSTEM ON TURBOPROPELLER-POWERED AIRCRAFT

(71) Applicant: PRATT & WHITNEY CANADA CORP., Longueuil (CA)

(72) Inventors: Giancarlo Zingaro, Pointe-Claire (CA); Carmine Lisio, Laval (CA); Jasraj Chahal, Lasalle (CA); Saadi Daftari, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 602 days.

(21) Appl. No.: 16/173,330

(22) Filed: Oct. 29, 2018

(65) Prior Publication Data

US 2020/0130855 A1    Apr. 30, 2020

(51) Int. Cl.
*B64D 31/08*    (2006.01)
*B64C 19/02*    (2006.01)
*F02C 9/28*    (2006.01)

(52) U.S. Cl.
CPC .............. *B64D 31/08* (2013.01); *B64C 19/02* (2013.01); *F02C 9/28* (2013.01)

(58) Field of Classification Search
CPC ........ B64C 19/02; B64D 31/04; B64D 31/06; B64D 31/02; B64D 31/10; B64D 31/12; B64D 31/14; F02C 9/285; F02C 9/58
See application file for complete search history.

(56) References Cited

U.S. PATENT DOCUMENTS

| | | | | |
|---|---|---|---|---|
| 4,551,972 A | * | 11/1985 | Lewis | F02C 9/00 60/39.281 |
| 5,029,778 A | * | 7/1991 | DeLuca | G05D 1/0638 244/234 |
| 5,078,345 A | * | 1/1992 | De Vries | G05D 1/063 244/182 |
| 5,188,316 A | * | 2/1993 | Dressier | B64D 31/02 244/236 |

(Continued)

FOREIGN PATENT DOCUMENTS

| EP | 1369669 | 12/2003 |
|---|---|---|
| EP | 3235734 | 10/2017 |

(Continued)

OTHER PUBLICATIONS

Yi Zheng, Xiaoyan Wang, Sen Yang and Xinmin Wang, Design and Simulation of Large Civil Aircraft's Thrust Management System, Jul. 6-8, 2012, Proceedings of the 10th World Congress on Intelligent Control and Automation, Beijing, China. (Year: 2012).*

*Primary Examiner* — Todd E Manahan
*Assistant Examiner* — Marc J Amar
(74) *Attorney, Agent, or Firm* — Norton Rose Fulbright Canada LLP

(57) ABSTRACT

Herein provided are methods and systems for a method for controlling autothrottle of an engine. A digital power request is obtained from an autothrottle controller, the digital power request based on an autothrottle input to the autothrottle controller. A manual input mode for the engine is terminated, the manual input mode based on a second power request obtained from a manual input associated with the engine. An autothrottle mode for the engine is engaged to control the engine based on the digital power request.

20 Claims, 8 Drawing Sheets

(56) References Cited

U.S. PATENT DOCUMENTS

| | | | | |
|---|---|---|---|---|
| 5,337,982 | A  * | 8/1994 | Sherry | G05D 1/0607 |
| | | | | 244/177 |
| 6,188,937 | B1 * | 2/2001 | Sherry | G01S 13/91 |
| | | | | 701/14 |
| 7,949,440 | B2 | 5/2011 | Ramos et al. | |
| 8,024,080 | B2 | 9/2011 | Greene | |
| 2008/0029653 | A1 * | 2/2008 | Johnson | F02C 9/28 |
| | | | | 244/175 |
| 2010/0287905 | A1 * | 11/2010 | Shepler | F02K 9/80 |
| | | | | 60/39.24 |
| 2015/0375853 | A1 * | 12/2015 | Kawalkar | B64D 43/02 |
| | | | | 244/50 |
| 2017/0259931 | A1 * | 9/2017 | Martindale | B64D 31/06 |
| 2018/0170567 | A1 * | 6/2018 | Hedrick | G07C 5/0816 |
| 2018/0237125 | A1 * | 8/2018 | Lisio | B64C 11/30 |
| 2019/0047715 | A1 * | 2/2019 | Hedrick | B64D 43/00 |
| 2020/0002018 | A1 * | 1/2020 | Alaimo, Jr. | F02C 9/00 |
| 2021/0016871 | A1 * | 1/2021 | Landers | B64C 13/18 |
| 2021/0371083 | A1 * | 12/2021 | Lambton | B64C 13/507 |

FOREIGN PATENT DOCUMENTS

| | | | | |
|---|---|---|---|---|
| EP | 3409927 | A1 * | 12/2018 | F01D 17/085 |
| KR | 2013056652 | A | 5/2013 | |

* cited by examiner

AUTOTHROTTLE CONTROL SYSTEM ON TURBOPROPELLER-POWERED AIRCRAFT

TECHNICAL FIELD

The present disclosure relates generally to gas turbine engines, and more particularly to autothrottle control in gas turbine engines.

BACKGROUND OF THE ART

Modern aircraft increasingly incorporate automation to facilitate the task of operators and to reduce the risk of operator error. Some examples of automation in aircraft include roll control for facilitating roll-neutral yawing, thrust-based propeller blade scheduling, and the like. In some cases, the automation of these functions leads to a reduction in the amount of actions which need to be performed by the operator.

The automation systems developed in recent years have been deployed primarily in turbofan-powered aircraft, where a singular system controls the operation of each turbofan powerplant. In contrast, turbopropeller-powered aircraft typically use separate control systems for controlling the operation of the engine and the propeller. The dual nature of the control systems used in turbopropeller-powered aircraft complicates the implementation of automation.

As such, there is room for improvements.

SUMMARY

In accordance with a broad aspect, there is provided a method for controlling autothrottle of an engine, comprising: obtaining, from an autothrottle controller, a digital power request, the digital power request based on an autothrottle input to the autothrottle controller; terminating a manual input mode for the engine, the manual input mode based on a second power request obtained from a manual input associated with the engine; and engaging an autothrottle mode for the engine for controlling the engine based on the digital power request.

In some embodiments, the method further comprises: determining a target position for the manual input based on at least one of the digital power request and an operating parameter of the engine; transmitting the target position to an actuator coupled to the manual input to cause the manual input to adopt the target position.

In some embodiments, the method further comprises detecting a change in the operating parameter of the engine; determining a subsequent target position for the manual input based on the operating parameter of the engine; and transmitting the subsequent target position to actuator coupled to the manual input to cause the manual input to adopt the subsequent target position.

In some embodiments, the method further comprises evaluating an autothrottle readiness condition for the engine based on an operating parameter of the engine; and when the autothrottle readiness condition is met, producing an autothrottle readiness alert for an operator of the engine.

In some embodiments, the digital power request is obtained in response to the autothrottle readiness alert being provided.

In some embodiments, the manual input is a power lever, and wherein the manual input mode is based on a power lever angle of the power lever.

In some embodiments, controlling the engine based on the digital power request comprises: determining, based on the digital power request, a requisite engine power and a requisite propeller rotational speed for achieving a power level satisfying the digital power request; causing the engine to produce power commensurate with the requisite engine power; and causing a propeller associated with the engine to rotate at a speed commensurate with the requisite propeller rotational speed.

In some embodiments, wherein the autothrottle input comprises an indication of a target airspeed.

In some embodiments, the method further comprises producing a confirmation indication following the engaging.

In accordance with another broad aspect, there is provided a system for controlling autothrottle of an engine, comprising: a processing unit; and a non-transitory computer-readable medium coupled to the processing unit and comprising computer-readable program instructions executable by the processing unit for: obtaining, from an autothrottle controller, a digital power request, the digital power request based on an autothrottle input to the autothrottle controller; terminating a manual input mode for the engine, the manual input mode based on a second power request obtained from a manual input associated with the engine; and engaging an autothrottle mode for the engine for controlling the engine based on the digital power request.

In some embodiments, the program instructions are further executable for: determining a target position for the manual input based on at least one of the digital power request and an operating parameter of the engine; transmitting the target position to an actuator coupled to the manual input to cause the manual input to adopt the target position.

In some embodiments, the program instructions are further executable for: detecting a change in the operating parameter of the engine; determining a subsequent target position for the manual input based on the operating parameter of the engine; and transmitting the subsequent target position to actuator coupled to the manual input to cause the manual input to adopt the subsequent target position.

In some embodiments, the program instructions are further executable for: evaluating an autothrottle readiness condition for the engine based on an operating parameter of the engine; and when the autothrottle readiness condition is met, producing an autothrottle readiness alert for an operator of the engine.

In some embodiments, the digital power request is obtained in response to the autothrottle readiness alert being provided.

In some embodiments, the manual input is a power lever, and wherein the manual input mode is based on a power lever angle of the power lever.

In some embodiments, controlling the engine based on the digital power request comprises: determining, based on the digital power request, a requisite engine power and a requisite propeller rotational speed for achieving a power level satisfying the digital power request; causing the engine to produce power commensurate with the requisite engine power; and causing a propeller associated with the engine to rotate at a speed commensurate with the requisite propeller rotational speed.

In some embodiments, wherein the autothrottle input comprises an indication of a target airspeed.

In some embodiments, the program instructions are further executable for producing a confirmation indication following the engaging.

In accordance with a still further broad aspect, there is provided a method for controlling autothrottle of a powerplant of an aircraft, the powerplant comprising an engine and a propeller, the method comprising: obtaining, from an autothrottle controller, a digital thrust request, the digital thrust request based on an autothrottle input to the autothrottle controller; terminating a manual input mode for the powerplant, the manual input mode based on a power request obtained from a manual input associated with the engine; and engaging an autothrottle mode for the powerplant for controlling the engine and the propeller based on the digital thrust request.

In some embodiments, the digital thrust request comprises a digital power request and a digital rotational speed request, wherein controlling the engine and the propeller based on the digital power request comprises controlling the engine based on the digital power request and controlling the propeller based on the digital rotational speed request.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
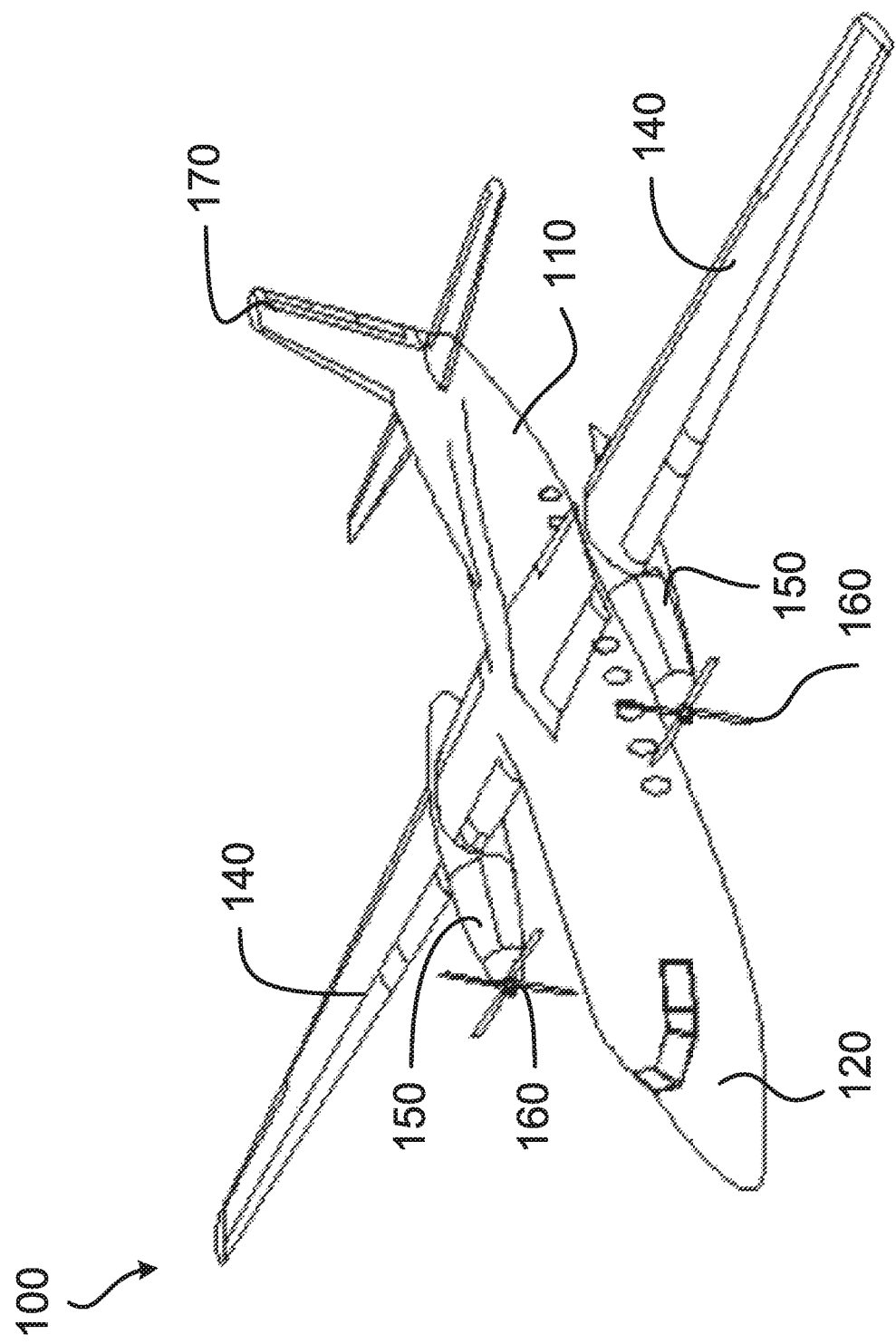
FIG. 1 is a schematic cross-sectional view of a gas turbine engine.

With reference to FIG. 1, an aircraft 100 is illustrated, having a fuselage 110, a pair of wings 140 (or more), engines 150, propellers 160, and a tail 170. The aircraft 100 may be any suitable aircraft—such as corporate, private, commercial, or the like—which includes multiple engines 150 and propellers 160. Collectively, an engine-propeller pair may be referred to as a "powerplant". The aircraft 100 may be a fixed wing or a rotary wing aircraft. The fuselage 110 has a cockpit 120, which can be positioned at any suitable location on the aircraft 100, for example at a front portion of the fuselage 110. The cockpit 120 is configured for accommodating one or more operators who control the aircraft 100 by way of one or more operator controls. The operator controls can include any suitable number of pedals, yokes, steering wheels, centre sticks, flight sticks, levers, knobs, switches, and the like. Although two engines 150 are illustrated, it should be understood that the aircraft 100 can have any suitable number of engines, for example three, four, six, eight, and the like.

The engines 150 effect rotational motion in the propellers 160, which in turn produce thrust via propeller blades, causing the aircraft 100 to be displaced. The propellers blades are configured for assuming a propeller blade angle, which varies the thrust produced by the propellers 160. The propeller blade angle is indicative of an orientation of the blades of the propellers 160 relative to a particular reference angle. For example, a positive propeller blade angle can cause the propellers 160 to produce forward thrust, that is to say, thrust which displaces the aircraft 100 in a direction aligned with the heading of the aircraft 100. Conversely, a negative propeller blade angle can cause the propellers 160 to produce reverse thrust, which is substantially opposite positive thrust.

In certain circumstances, for example during cruise portions of a flight mission, it can be desired to engage automatic control of part or all of the operation of powerplants of the aircraft 100, including of the engines 150 and/or the propellers 160. Automatic control of the engines 150 can be referred to as "autothrottle", and involves at least automatic control of a level of fuel flow to the engines 150. Autothrottle can also involve control of other operating parameters of the engines 150, including air intake and bleed, orientation of variable geometry mechanisms, and the like. In embodiments in which the aircraft 100 includes the propellers 160, the autothrottle can additionally control a rotational speed of the propellers 160.

Figure 2A:
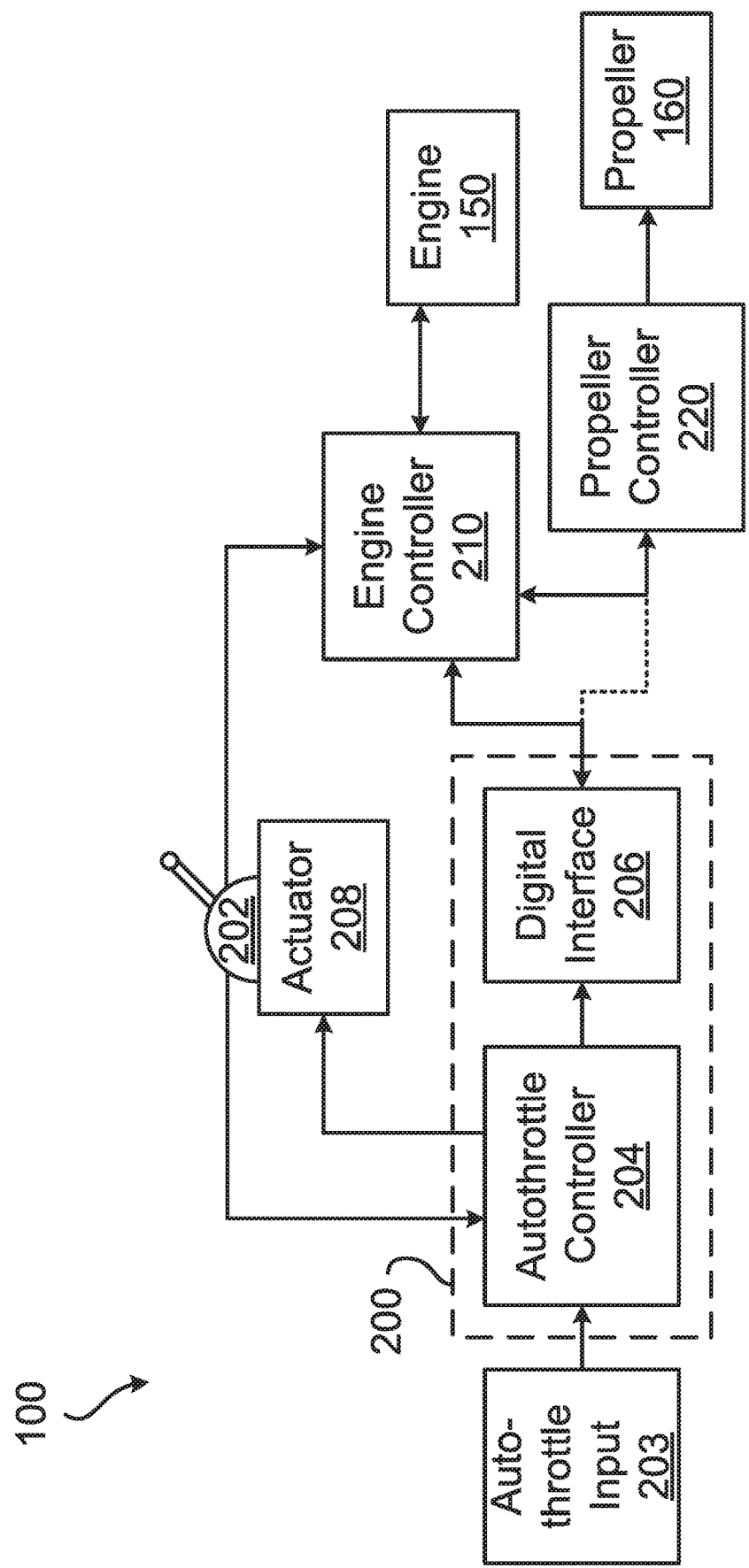
FIGS. 2A-C are block diagrams of example autothrottle systems.

With reference to FIG. 2A, there is illustrated a block diagram of an example autothrottle system 200 for an aircraft, for example the aircraft 100. The autothrottle system 200 is composed of an autothrottle controller 204 and a digital interface 206. Although illustrated here as separate components, it should be understood that in some embodiments, the autothrottle controller 204 and the digital interface 206 can be implemented via a single entity, for example any suitable digital control components. The aircraft 100 additionally includes an engine controller 210, for controlling operation of the engine 150, a propeller controller 220, for controlling operation of the propeller 160, as well as a manual input 202, to which is coupled an actuator 208, and an autothrottle input 203.

The manual input 202 allows an operator of the aircraft 100 to provide an indication of a desired power setting for the engine 150. The manual input 202 can be a power lever, a pedal, or a similar device, and a power setting for the engine 150 can be represented as a power lever angle, a position of the pedal, and the like. In some embodiments, the manual input 202 is an analog input device. In some cases, the power lever is provided with a plurality of settings, including a maximum takeoff setting, a flight idle setting, a ground idle setting, and a reverse thrust setting, each associated with respective power lever angles. The manual input 202 can provide a signal to the engine controller 210, which indicates the power lever angle, and the engine controller can interpret the signal to determine one or more engine settings for the engine 150. In some embodiments, the manual input 202 also allows the operator to provide an indication of a desired rotational speed for the propeller 160. In other embodiments, the rotational speed for the propeller 160 is scheduled or otherwise defined as a function of the power setting for the engine 150. In still further embodiments, the manual input 202 can be one of many inputs, and can include a separate input for controlling operation of the propeller 160, including setting a desired rotational speed for the propeller 160. Still other embodiments are considered.

The autothrottle input 203 allows an operator of the aircraft 100 to indicate that an autothrottle mode of operation for the powerplants of the aircraft 100 should be engaged. In many embodiments, the autothrottle mode is engaged for all powerplants of the aircraft 100 substantially simultaneously, and the particular control commands then issued to the powerplants may vary between powerplants. In some embodiments, the autothrottle mode controls operation of the engine 150 and the propeller 160, for example via the engine and propeller controllers 210, 220. In other embodiments, the autothrottle mode controls operation of the engine 150, for example via the engine controller 210, and operation of the propeller 160, via the propeller controller 220, can be effected via the engine controller 210. Still other implementations of an autothrottle mode are considered. The autothrottle input 203 can be implemented via any suitable input device. In some embodiments, the autothrottle input 203 is a button or other binary control. In other embodiments, the autothrottle input 203 includes a selection input via which a particular setting for the autothrottle control can be selected, for example a cruise speed or other airspeed, a rate of fuel expenditure, and the like. Still other implementations of the autothrottle input 203 are considered. For example, the autothrottle input 203 can be part of a flight computer of the aircraft 100.

The engine controller 210 and the propeller controller 220 are configured to control operation of the engine 150 and the propeller 160, respectively. The engine controller 210 can be implemented using a full-authority digital electronic controller (FADEC) or similar digital control device. The propeller controller 220 can be implemented using a propeller electronic control (PEC) or similar digital control device. In operation, the engine controller 210 obtains a power request for the engine 150 from the manual input 202, which can be a power lever angle. The engine controller 210 can then issue various commands to engine 150 and to the propeller controller 220, which in turn can issue commands to the propeller 160. In this fashion, the operating parameters of the engine 150 and the propeller 160 can be altered to produce output power commensurate with the power request issued via the manual input 202, or via other inputs, as described hereinbelow, for example from the autothrottle system 200.

The autothrottle controller 204 is communicatively coupled to the manual input 202, to the autothrottle input 203, to the digital interface 206, and to the actuator 208. The autothrottle controller 204 can obtain, from the manual input 202, an indication of the power setting for the engine 150, for instance the aforementioned power lever angle. In addition, autothrottle controller 204 is configured for obtaining, from the autothrottle input 203, a request to engage the autothrottle mode (referred to herein as "autothrottle request"), and optionally one or more settings for the autothrottle mode.

In response to obtaining the autothrottle request, the autothrottle controller 204 can command the digital interface 206 to produce a digital power request for transmission to the engine controller 210. In some embodiments, the autothrottle controller 204 and/or the digital interface 206 translate the information provided as part of the autothrottle request into a requisite power setting for the engine 150, for example using any suitable algorithm, scheduling table, lookup table, and the like.

The digital interface 206 is communicatively coupled to autothrottle controller 204 for obtaining the command to produce the digital power request, and to the engine controller 210 for providing the engine controller 210 with the digital power request. In some embodiments, the digital interface 206 includes a digital concentrator. In other embodiments, the digital interface 206 includes an analog-to-digital converter (ADC). The digital interface 206 can receive an analog power request from the autothrottle controller 204, and can convert the analog power request into a digital power request for transmission to the engine controller 210. Still other implementations are considered, and the digital interface 206 can produce the digital power request using any suitable protocols, interfaces, and can communicate the digital power request using any suitable wired and/or wireless media.

In this fashion, the autothrottle request obtained via the autothrottle input 203 is communicated to the engine controller 210 as a digital power request, provided by the digital interface 206. The digital power request bypasses the manual input 202, and the engine controller 210 can then control the engine 150, and in some cases the propeller 160, via the propeller controller 220, based on the digital power request. Put differently, when the autothrottle mode is engaged, the manual input 202, which can be an analog input device, is not used to control the operation of the engine 150 and/or the propeller 160. Instead, the engine 150 and/or the propeller 160 are controlled via a digital input, namely that provided via the digital interface 206.

When the engine controller 210 receives the digital power request, the engine controller 210 first terminates a pre-existing control mode for the engine 150. The pre-existing control mode can, for example, be based on the manual input 202, and can be referred to as a "manual input mode". Once the manual input mode has been terminated, the autothrottle mode for the engine 150 can be engaged, wherein the engine 150 is controlled based on the digital power request obtained by the engine controller 210 from the digital interface 206.

In some embodiments, when the engine controller 210 engages the autothrottle mode in response to the digital power request, the engine controller 210 determines a requisite power for the engine 150 for achieving a power level satisfying the digital power request. Additionally, in some cases, the engine controller 210, or the propeller controller 220, also determines a requisite propeller rotational speed for the propeller 160 for achieving the power level satisfying the digital power request. Once the requisite power for the engine 150, and optionally the requisite propeller rotational speed for the propeller 160, are determined, the engine controller 210 and/or the propeller controller 220 cause the engine 150 and the propeller 160 to operate commensurately with the requisite power for the engine 150 and propeller rotational speed for the propeller 160.

In order to determine the requisite power for the engine 150, and optionally the requisite propeller rotational speed for the propeller 160, the engine controller 210 and/or the propeller controller 220 can be provided with any suitable thrust conversion algorithms for determining the appropriate operating parameters for the engine 150 and/or the propeller 160. In some embodiments, the engine controller 210 and/or the propeller controller 220 are provided with various information about the operating conditions of the engine 150 and/or the propeller 160, including factors for determining aircraft drag, and the like.

In some other embodiments, the autothrottle system 200 determines a requisite thrust level for the powerplant(s) of the aircraft 100, including the thrust contributions of both the engine 150 and the propeller 160. In one example, the autothrottle system 200 can then determine, based on the requisite thrust level, a requisite power level for the engine 150 and a requisite rotational speed for the propeller 160. The digital interface 206 can then communicate to the engine controller 210 optionally the propeller controller 220 respective digital power and rotational speed requests. Alternatively, the digital interface 206 can communicate a digital thrust request to the engine controller 210, which can contain both the digital power request for the engine 150 and a digital rotational speed request for the propeller 160. The engine controller 210 can then provide the digital rotational speed request to the propeller 160. The digital thrust request can be provided to the engine controller 210 in any suitable fashion, for example substantially similarly to the way in which the digital power request is provided to the engine controller 210.

In another example, the autothrottle system 200 provides the engine controller 210 with a digital thrust request, and the engine controller 210 is configured for determining, based thereon, a requisite power level for the engine 150 and a requisite rotational speed for the propeller 160. This can include producing a digital power request, used within the engine controller 210, and optionally a digital rotational speed request, which can be provided to the propeller controller 220. In this example, the engine controller 210 can be provided with any suitable number of schedules, lookup tables, algorithms, and the like, for determining the appropriate requisite power level and rotational speed for the engine 150 and the propeller 160, respectively, based on the digital thrust request. Alternatively, the autothrottle system 200 can provide schedules, lookup tables, algorithms, and the like, as needed to the engine controller 210. Still other approaches are considered.

In addition, the autothrottle system 200 can obtain, for example via the digital interface 206, information regarding changes in operating conditions of the engine 150 and/or of the propeller 160. Changes in operating conditions can include changes in ambient temperature, ambient pressure, altitude, airspeed, and the like. In response to these changes, the autothrottle system 200 is configured for issuing a subsequent digital power request to adjust the operation of the engine 150 and/or the propeller 160, via the engine controller 210 and/or the propeller controller 220, in order to align the operation of the engine 150 and/or the propeller 160 with the autothrottle request obtained from the autothrottle input 203.

In some embodiments, the engine controller 210 is configured for reporting to the autothrottle system 200, for instance via the digital interface 206, an autothrottle readiness condition for the engine. The autothrottle readiness condition can be indicative of whether the engine 150 and/or the propeller 160 are operating in a state suitable for engaging the autothrottle mode. In some embodiments, the autothrottle controller 204 can provide an autothrottle readiness alert to an operator of the aircraft 100, for example via the autothrottle input 203, that the autothrottle readiness condition is met. For instance, the autothrottle input 203 can be provided with a lamp or other visual indicator, which can be actuated when the autothrottle readiness condition is met. In another instance, the autothrottle input 203 can produce an audible chime or other audible indicator when the autothrottle readiness condition is met. Still other approaches for reporting the autothrottle readiness condition to the operator of the aircraft 100 are considered. In some embodiments, the autothrottle request is obtained in response to providing the autothrottle readiness alert to the operator of the aircraft 100.

Alternatively, or in addition, the autothrottle system 200 can produce a confirmation indication for the operator of the aircraft 100 once the autothrottle mode is engaged. The confirmation indication can be provided via the visual indicator, the audible indicator, or any other suitable system. For example, the confirmation indication can be displayed on a screen of a flight computer of the aircraft 100. In some embodiments, the confirmation indication can also include other information regarding the autothrottle mode, including a current airspeed of the aircraft, a fuel expenditure rate for the aircraft, and the like.

In some embodiments, the autothrottle controller 204 is configured for adjusting the manual input 202 based on the digital power request produced by the digital interface 206. For example, in cases in which the autothrottle request results in a significant change in the power produced by the engine 150, a mismatch between the actual power level of the engine 150 and the power level which would be requested if the engine 150 were controlled based on the manual input 202 results. By adjusting the manual input 202 based on the digital power request, a transition from the autothrottle mode to another flight mode, for example the manual input mode, can be performed more smoothly, reducing a so-called "thrust bump". In some embodiments, adjustments to the manual input 202 are also performed in order to reduce or eliminate the possibility of "loss of thrust control", which may be required by certain regulatory bodies.

In this fashion, the autothrottle system 200, for example the autothrottle controller 204, can determine a target position for the manual input 202 based on the digital power request produced by the digital interface 206. In some embodiments, the target position can also be based on one or more operating parameters of the engine 150. In embodiments in which the manual input 202 is a power lever, the target position can be a particular power lever angle. The autothrottle controller 204 is configured for commanding the actuator 208 for causing the manual input 202 to adopt the target position. The autothrottle controller 204 can command the actuator 208 using any suitable instructions, protocols, and the like. For example, the autothrottle controller 204 can provide the target position to the actuator 208, which interprets the target position as a command to cause the manual input 202 to adopt the target position.

In addition, the autothrottle system 200 can periodically, or punctually, assess the position of the manual input 202 against the operating parameters of the engine 150, and command further changes in the position of the manual input 202 in accordance therewith. For example, the autothrottle system 200 can detect a change in one or more operating parameters of the engine 150 and/or of the propeller 160, and determine a subsequent target position for the manual input 202 based on the operating parameters. If the actual position of the manual input 202 differs from the subsequent target position, the autothrottle controller 204 can command the actuator 208 to cause the manual input to adopt the subsequent target position. The autothrottle system 200 can repeatedly assess the position of the manual input and adjust it as frequently as appropriate.

In some embodiments, a predetermined tolerance is provided for the target position, and if a mismatch between a current position of the manual input 202 and the target position is within the tolerance, the actuator 208 is not commanded to cause the manual input 202 to adopt the target position. For example, the manual input 202 can be set at a position of 45°, and the target position can be 48°. If the tolerance allows a variation of ±5°, the actuator 208 will not be commanded to adjust the position of the manual input 202. Other values for the tolerance, and other methods of assessing the tolerance, are also considered. For example, the tolerance can be based on different engine settings, such as high cruise, mid cruise, low cruise, and the like. In another example, the tolerance is set at approximately 5%, 10%, 15%, or any other suitable percent-based value.

In some embodiments, the tolerance used for the mismatch between the manual input 202 and the target position serves to reduce the strain on the actuator 208 and/or to minimize distractions for the operator of the aircraft 100. By allowing the mismatch to remain within the predetermined tolerance without adjusting the manual input 202, changes to the position of the manual input 202 can be effected only periodically, in response to the mismatch between the current position and the target position exceeding the tolerance.

In some additional embodiments, the autothrottle system 200 can alert an operator of the aircraft 100 when a mismatch in excess of the predetermined tolerance exists between the current position of the manual input 202 and the target input. The alert can be a visual alert, an audible alert, and the like, and can, for example, be displayed via a flight computer of the aircraft 100. The alert can also suggest to the operator to adjust the position of the manual input 202 to align with the position of the manual input 202 to the target position, for example in embodiments in which the actuator 208 is omitted. Alternatively, or in addition, when the mismatch is in excess of the predetermined tolerance, the engine controller 210, or any other suitable device, can issue a fault which causes the autothrottle mode to be disabled. This can result in the manual input mode, based on the manual input 202, to become engaged, and in some cases can additionally cause a maintenance action to be flagged, for example for the operator of the aircraft 100.

Figure 2B:
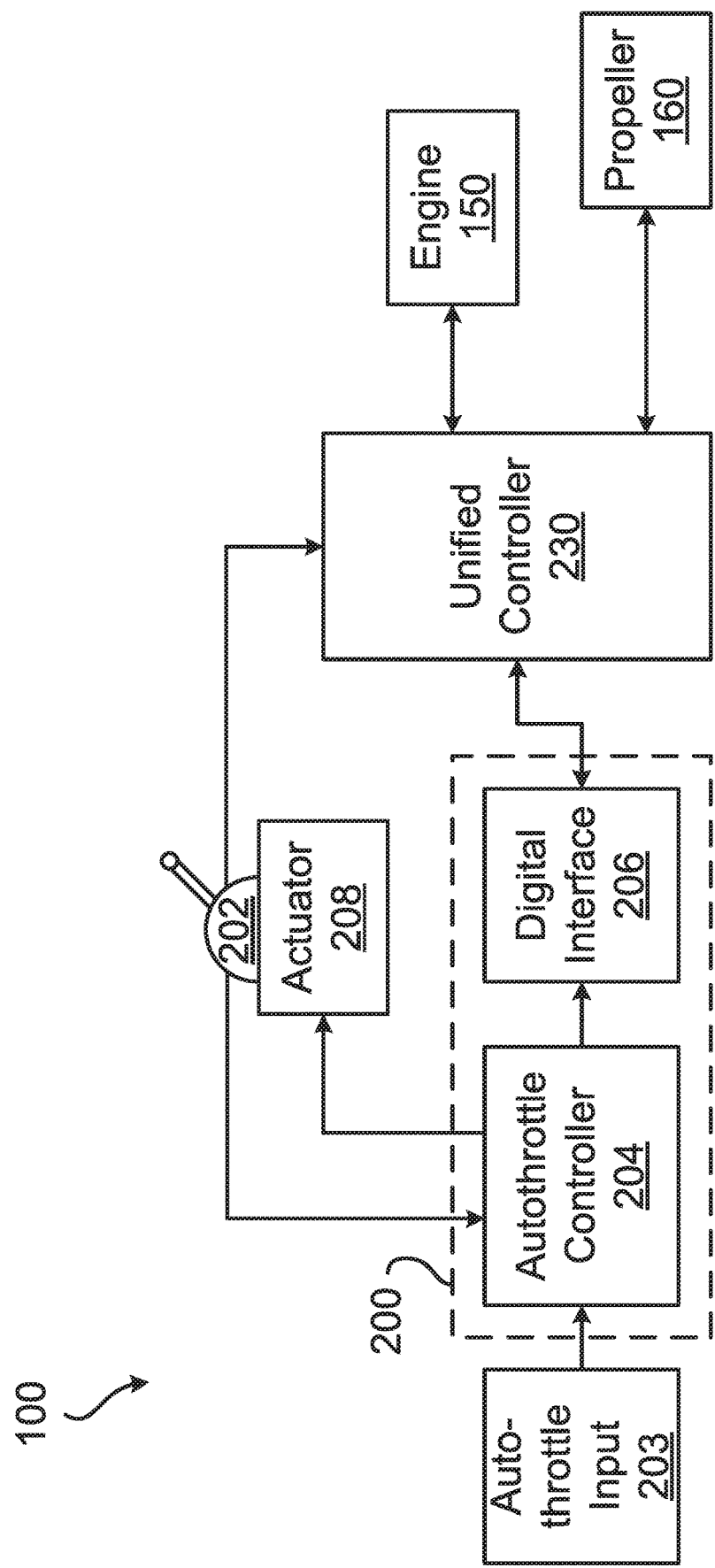

With reference to FIG. 2B, in an alternative embodiment, the engine controller 210 and the propeller controller 220 can be replaced by a unified controller 230, which is configured for controlling operation of both the engine 150 and the propeller 160. The unified controller 230 can be controlled based on the manual input 202, for instance when operating in the manual input mode. When the unified controller 230 receives the digital power request via the digital interface 206 from the autothrottle controller, the unified controller 230 is configured for terminating the manual input mode and for engaging the autothrottle mode, thereby controlling the engine 150 and the propeller 160 based on the digital power request. It should be noted that the unified controller 230 can use the same control laws, algorithms, schedules, tables, and the like, in both the autothrottle mode and the manual input mode, and the unified controller 230 uses different inputs—from the manual input 202 or the digital power request—based on the mode of operation.

In some embodiments, the unified controller 230 is configured for receiving the aforementioned digital thrust request from the digital interface 206. The unified controller 230 can then determine, based on the digital thrust request, a requisite power level for the engine 150 and a requisite rotational speed for the propeller 160. For example, the unified controller 230 can produce a digital power request, used within the engine controller 210, and optionally a digital rotational speed request, which can be provided to the propeller controller 220. Still other approaches are considered.

Figure 2C:
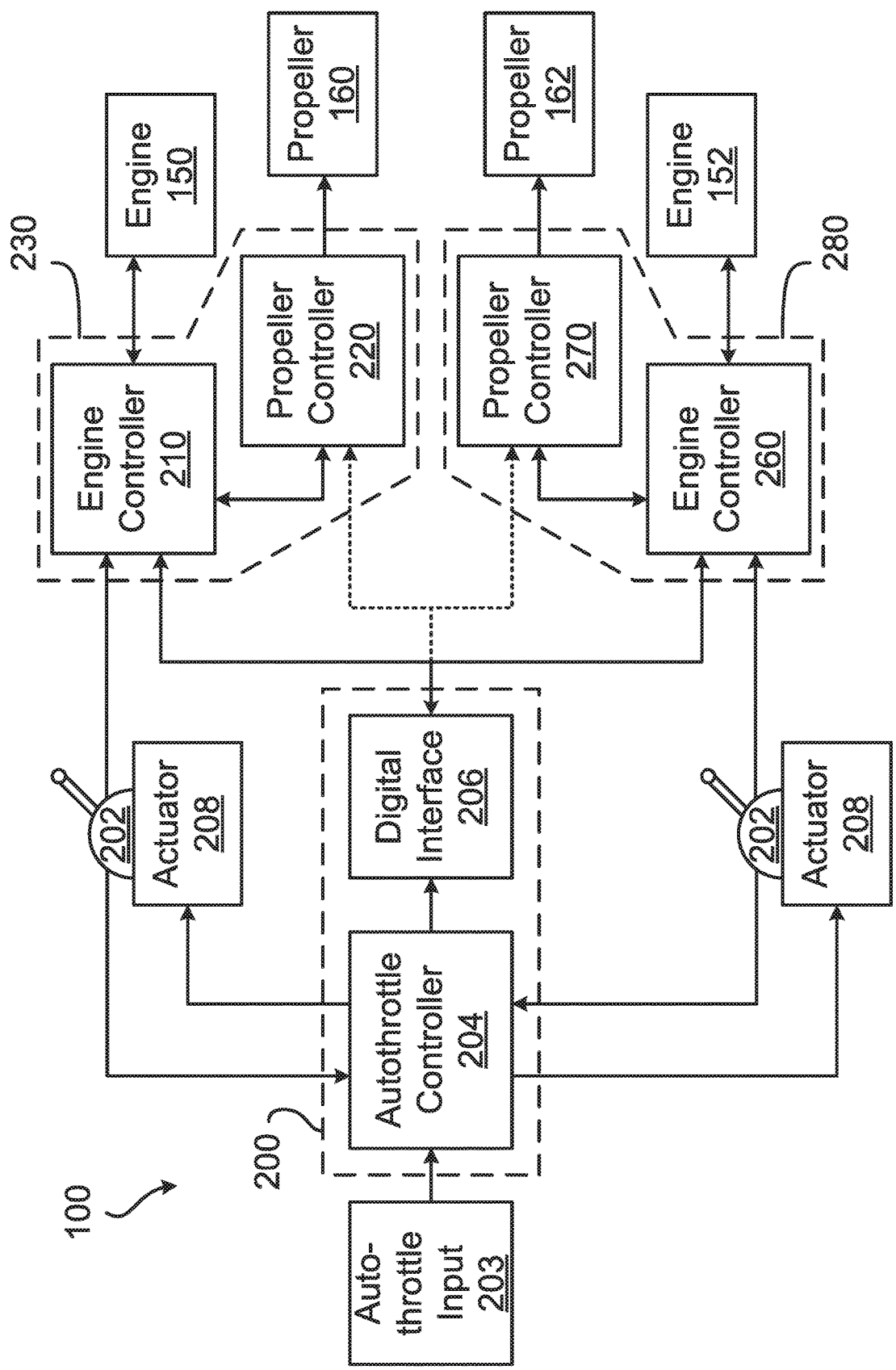

With reference to FIG. 2C, the techniques described herein can be applied to aircraft 100 with multiple powerplants, that is to say, with more than one engine and a commensurate number of propellers. In this embodiment, the aircraft 100 is provided with two engines 150, 152, and two propellers 160, 162, though it should be understood that the aircraft can be provided with any suitable number of engines and propellers including three, four, six, eight, or any other suitable number. Each powerplant is provided with suitable controllers: the engine 150 is controlled by the engine controller 210, the propeller 160 is controlled by the propeller controller 220, the engine 152 is controlled by engine controller 260, and the propeller 162 is controlled by propeller controller 270. Alternatively, the engine and propeller controllers can be replaced by unified controllers 230, 280, as appropriate.

The autothrottle system 200 is thus coupled to controllers for both engines 150, 152, via the digital interface 206. The digital interface 206 is configured for providing digital power requests to controllers for both engines 150, 152, in order to cause the engines 150, 152, to operate in the autothrottle mode. In some embodiments, both the engine controllers 210, 260 receive the same digital power request. In other embodiments, the engine controllers 210, 260 receive different power requests, for example power requests that are scaled based on operating parameters of the engines 150, 152, as provided by the engine controllers 210, 260. The same techniques can be applied with unified controllers 230, 280.

Figure 3:
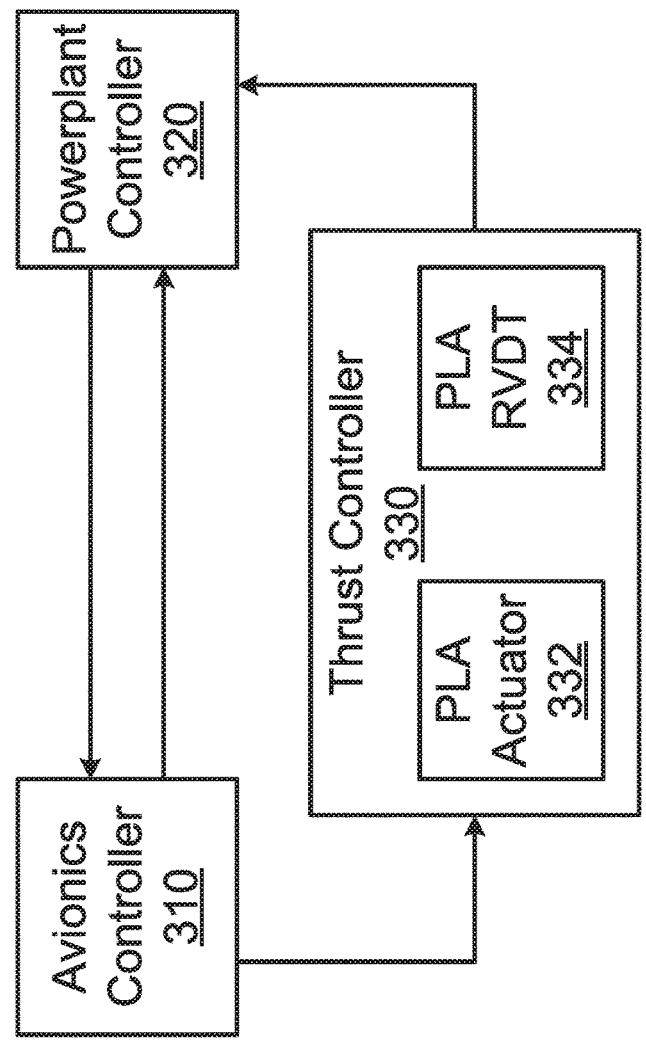
FIG. 3 is a system diagram of an example autothrottle system.

With reference to FIG. 3, a system diagram for the aircraft 100 is illustrated. The aircraft 100 contains an avionics controller 310, a powerplant controller 320, and a thrust controller 330. The avionics controller 310 is configured for receiving various control inputs from an operator of the aircraft 100, including a request to engage an autothrottle mode for the aircraft 100. Thus, the avionics controller 310 can include the autothrottle input 203 as well as the autothrottle system 200 of FIGS. 2A-C. The powerplant controller 320 is configured for controlling the operation of a powerplant of the aircraft 100, for example the engine 150 and the propeller 160 of FIGS. 2A-C. The thrust controller 330 is composed of a power lever angle (PLA) actuator 332, and a PLA rotary variable differential transformer (RVDT) 334, and is configured for providing the powerplant controller 320 with instructions on how the powerplant of the aircraft 100 should be operated. For example, the thrust controller 330 can include the manual input 202 and the actuator 208 of FIGS. 2A-C.

In some control modes, for example the manual input mode discussed hereinabove, the operation of the powerplant is largely determined by inputs received at the powerplant controller 320 from the thrust controller 330, for example from the PLA RVDT 334. For example, the PLA RVDT 334 can translate a power lever angle of a power lever or other embodiment of the manual input 202 into a power request for transmission to the powerplant controller 320.

In order to cause the powerplant controller 320 to engage the autothrottle mode, the avionics controller 310 is configured for providing the digital power request to the powerplant controller 320, bypassing the thrust controller 330. The powerplant controller 320 can then terminate the manual input mode, and engage the autothrottle mode based on the digital power request. The powerplant controller 320 can then inform the avionics controller 310 of a target position for the power lever of the PLA RVDT 334, and, in turn, the avionics controller 310 can instruct the PLA actuator 334 to cause the power lever to adopt the target position.

Figure 4A:
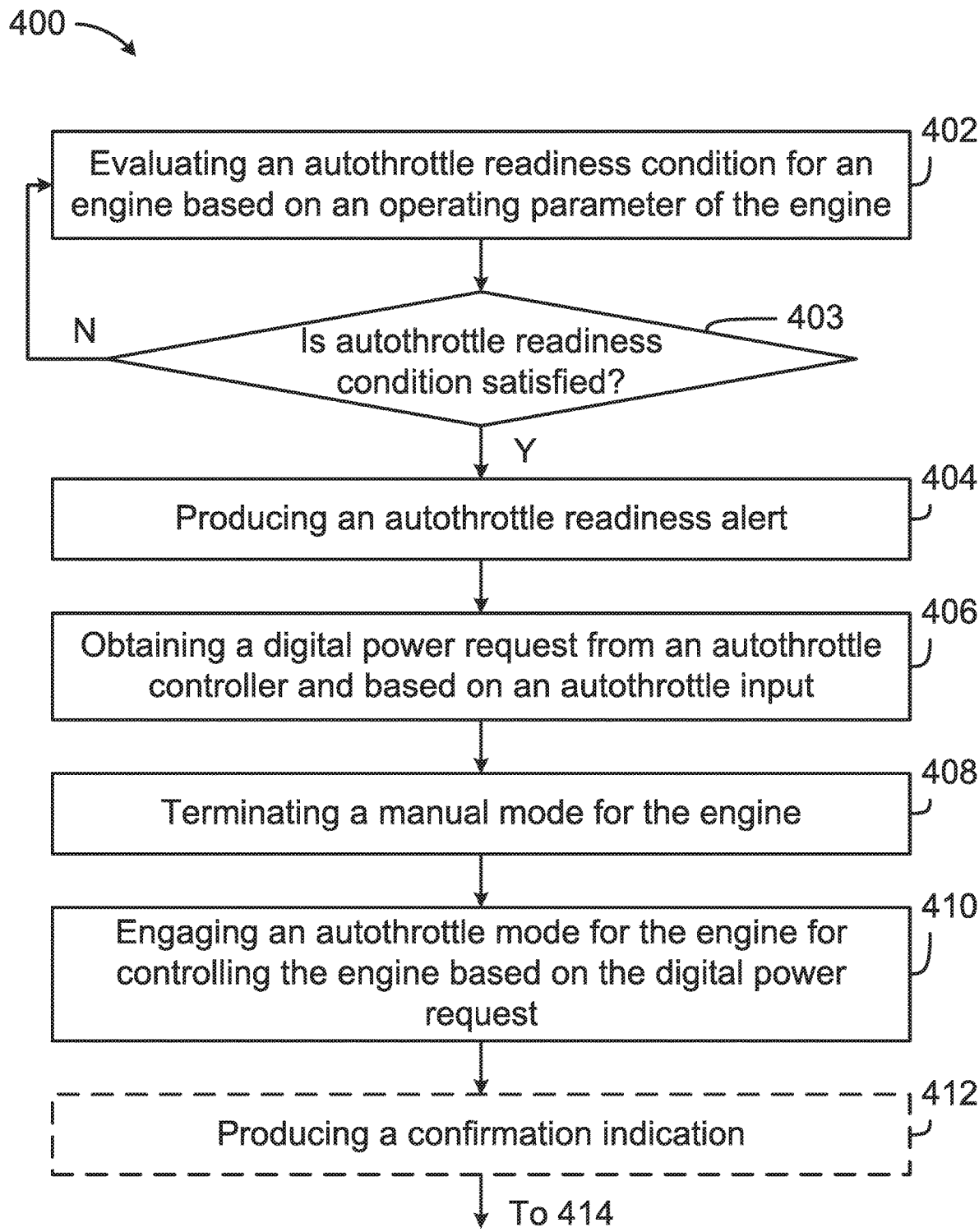
FIGS. 4A-B are flowcharts illustrating an example method for controlling autothrottle of an engine, in accordance with an embodiment.

With reference to FIG. 4A, there is illustrated a method 400 for controlling autothrottle of an engine, for example the engine 150 for the aircraft 100. In some embodiments, the method 400 can be implemented via the engine controller 210 and, optionally, the propeller controller 220, or by the unified controller 230, and in collaboration with the autothrottle system 200, although other embodiments are considered.

At step 402, an autothrottle readiness condition for the engine 150 is evaluated. The autothrottle readiness condition can be based on the particular mode of operation of the engine, one or more operating parameters of the engine, and the like. At decision step 403, if the autothrottle readiness condition is satisfied, the method 400 moves to step 404. If the autothrottle readiness condition is not satisfied, the method 400 returns to step 402.

At step 404, an autothrottle readiness alert is produced, for example for an operator of an aircraft in which the engine 150 is operating, for instance the aircraft 100. The autothrottle readiness alert can be a visual alert, an audible alert, or any other suitable kind of alert.

At step 406, a digital power request is obtained from an autothrottle controller, based on an autothrottle input. The digital power request can be obtained at the engine controller 210 from the autothrottle system 200, for example from the digital interface 206, and is based on the autothrottle request obtained via the autothrottle input 203. The digital power request can include any suitable information for controlling the operation of the engine 150 as part of an autothrottle mode. In some embodiments, the autothrottle input 203 is part of a flight computer of the aircraft 100, which is configured for receiving input from an operator of the aircraft 100.

At step 408, a manual input mode of control for the engine 150 is terminated. At step 410, the autothrottle mode for the engine 150 is engaged, based on the digital power request. The autothrottle mode can be used to control operation of the engine 150 in any suitable fashion. For example, a requisite power output for the engine 150, and optionally a requisite propeller rotation speed for the propeller 160, can be determined, and the engine 150 and the propeller 160 can be caused to produce power and rotational speed, respectively, commensurate with the requisite amounts.

Optionally, at step 412, a confirmation indication can be produced once the autothrottle mode has been engaged. The confirmation indication can be a visual alert, an audible alert, or any other suitable kind of alert, for example displayed via a flight computer of the aircraft 100.

Figure 4B:
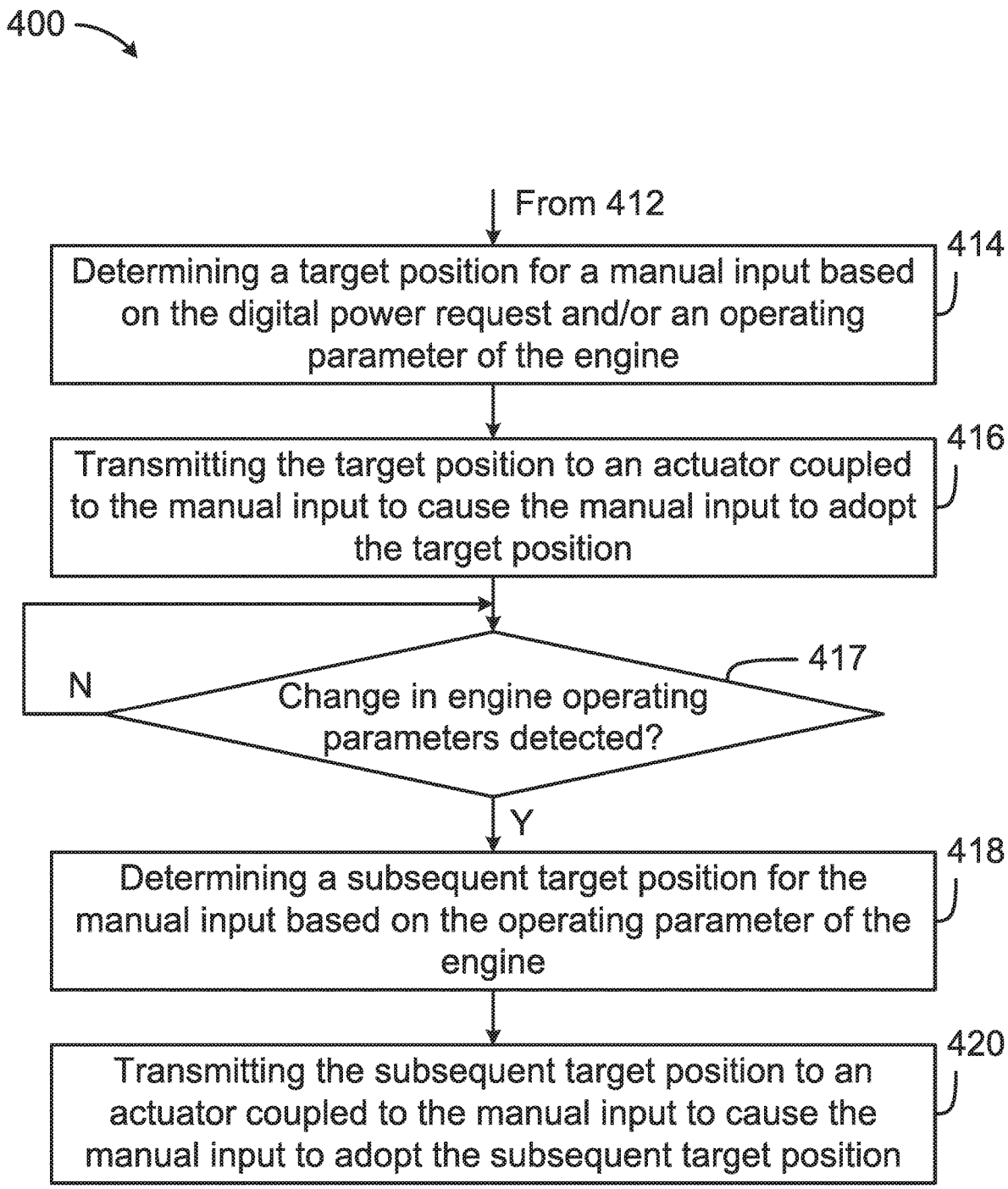

With additional reference to FIG. 4B, at step 414, a target position for a manual input, for example the manual input 202, can be determined based on the digital power request, and optionally based on one or more operating parameters of the engine 150. The target position can be indicative of a position which the manual input 202 would assume to produce an output from the engine 150 which matches the requisite power output requested via the digital power request. At step 416, the target position can be transmitted to an actuator coupled to the manual input 202, for example the actuator 208, to cause the manual input 202 to adopt the target position.

In some embodiments, the actuator 208 can be repeatedly used to ensure that the manual input 202 is substantially continuously, periodically, or punctually adjusted to adopt new target positions, for example in response to changes in the operating conditions of the engine 150. At decision step 417, a determination is made regarding whether a change in operating parameters of the engine 150 is detected. If no changes are detected, the method 400 can return to step 417. If changes are detected, the method 400 proceeds to step 418.

At step 418, a subsequent target position for the manual input 202 can be determined, for example based on the operating parameters of the engine 150. At step 420, the subsequent target position can be transmitted to the actuator 208 to cause the manual input 202 to adopt the subsequent target position. In some embodiments, steps 417, 418, and 420 can be repeated substantially continuously, periodically, or punctually throughout a period of time in which the engine 150 is operated in the autothrottle mode.

Figure 5:
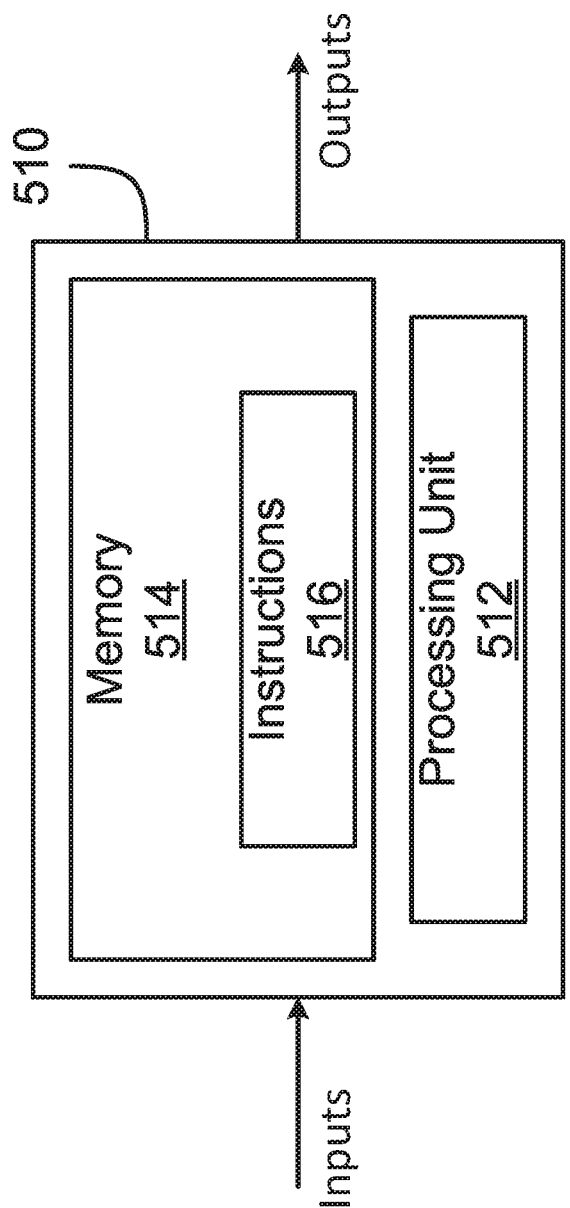
FIG. 5 is a block diagram of an example computer system for implementing the method of FIGS. 4A-B.

With reference to FIG. 5, one or more of the autothrottle system 200, the engine controllers 210, 260, the propeller controllers 220, 270, and/or the unified controllers 230, 280, may be implemented by a computing device 510, comprising a processing unit 512 and a memory 514 which has stored therein computer-executable instructions 516. The processing unit 512 may comprise any suitable devices configured to implement the system 500 such that instructions 516, when executed by the computing device 510 or other programmable apparatus, may cause the functions/acts/steps of the method 400 as described herein to be executed. The processing unit 512 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

In some embodiments, the computing device 510 can include one or more full-authority digital engine controls (FADEC), one or more propeller electronic control (PEC) units, and the like. In some embodiments, the engine controllers 210, 260 are implemented as dual-channel FADECs. In other embodiments, the engine controllers 210, 260 are implemented as two separate single-channel FADECs. Additionally, in some embodiments the propeller controllers 220, 270 are implemented as dual-channel PECs, or as two single-channel PECs, or any suitable combination thereof. The unified controllers 230, 280 can be implemented as any suitable combination of FADECs, PECs, and/or any other suitable control devices.

The methods and systems for controlling autothrottle of an engine described herein may be implemented in a high level procedural or object oriented programming or scripting language, or a combination thereof, to communicate with or assist in the operation of a computer system, for example the computing device 500. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or in some embodiments the processing unit 512 of the computing device 510, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to illustrate examples only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for controlling autothrottle of an engine for a turbopropeller-powered aircraft, comprising:
  obtaining, from an autothrottle controller, a digital power request, the digital power request based on an autothrottle input to the autothrottle controller;
  in response to obtaining the digital power request, terminating a manual input mode for the engine, the engine, when in the manual input mode, controlled based on a power request obtained from a manual input associated with the engine;
  engaging an autothrottle mode for controlling the engine based on the digital power request rather than on the power request obtained from the manual input; and
  adjusting a position of the manual input with the autothrottle controller based on the digital power request for controlling a transition of the engine out of the autothrottle mode.

2. The method of claim 1, wherein the adjusting the position of the manual input based on the digital power request comprises:
  determining a target position for the manual input based on the digital power request and/or at least one operating condition of the engine;
  transmitting the target position to an actuator coupled to the manual input to cause the manual input to adopt the target position.

3. The method of claim 2, further comprising:
  detecting a change in the at least one operating condition of the engine;
  determining a subsequent target position for the manual input based on the at least one operating condition of the engine; and
  transmitting the subsequent target position to actuator coupled to the manual input to cause the manual input to adopt the subsequent target position.

4. The method of claim 1, further comprising:
  evaluating an autothrottle readiness condition for the engine based on at least one operating condition of the engine; and
  when the autothrottle readiness condition is met, producing an autothrottle readiness alert for an operator of the engine.

5. The method of claim 4, wherein the digital power request is obtained in response to the autothrottle readiness alert being provided.

6. The method of claim 1, wherein the manual input is a power lever, and wherein the manual input mode is based on a power lever angle of the power lever.

7. The method of claim 1, wherein the controlling the engine based on the digital power request comprises:
  determining, based on the digital power request, a requisite engine power and a requisite propeller rotational speed for achieving a power level satisfying the digital power request;
  causing the engine to produce power commensurate with the requisite engine power; and
  causing a propeller associated with the engine to rotate at a speed commensurate with the requisite propeller rotational speed.

8. The method of claim 1, wherein the autothrottle input comprises an indication of a target airspeed.

9. The method of claim 1, further comprising producing a confirmation indication following the engaging.

10. A system for controlling autothrottle of an engine for a turbopropeller-powered aircraft, comprising:
  a processing unit configured to execute computer-readable program instructions; and
  a non-transitory computer-readable medium coupled to the processing unit and comprising the computer-readable program instructions for:
    obtaining, from an autothrottle controller, a digital power request, the digital power request based on an autothrottle input to the autothrottle controller;
    in response to obtaining the digital power request, terminating a manual input mode for the engine, the engine, when in the manual input mode, controlled based on a power request obtained from a manual input associated with the engine;
    engaging an autothrottle mode for controlling the engine based on the digital power request rather than on the power request obtained from the manual input; and
    adjusting a position of the manual input based on the digital power request for controlling a transition of the engine out of the autothrottle mode.

11. The system of claim 10, the program instructions being executable for adjusting the position of the manual input based on the digital power request by:
  determining a target position for the manual input based on the digital power request and/or at least one operating condition of the engine;
  transmitting the target position to an actuator coupled to the manual input to cause the manual input to adopt the target position.

12. The system of claim 11, the program instructions being further executable for:
  detecting a change in the at least one operating condition of the engine;

determining a subsequent target position for the manual input based on the at least one operating condition of the engine; and transmitting the subsequent target position to actuator coupled to the manual input to cause the manual input to adopt the subsequent target position.

13. The system of claim 12, the program instructions being further executable for:

evaluating an autothrottle readiness condition for the engine based on at least one operating condition of the engine; and when the autothrottle readiness condition is met, producing an autothrottle readiness alert for an operator of the engine.

14. The system of claim 13, wherein the digital power request is obtained in response to the autothrottle readiness alert being provided.

15. The system of claim 10, wherein the manual input is a power lever, and wherein the manual input mode is based on a power lever angle of the power lever.

16. The system of claim 10, wherein controlling the engine based on the digital power request comprises:

determining, based on the digital power request, a requisite engine power and a requisite propeller rotational speed for achieving a power level satisfying the digital power request;

causing the engine to produce power commensurate with the requisite engine power; and causing a propeller associated with the engine to rotate at a speed commensurate with the requisite propeller rotational speed.

17. The system of claim 10, wherein the autothrottle input comprises an indication of a target airspeed.

18. The system of claim 10, the program instructions being further executable for producing a confirmation indication following the engaging.

19. A method for controlling autothrottle of a powerplant of an aircraft, the powerplant comprising an engine and a propeller, the method comprising:

obtaining, from an autothrottle controller, a digital thrust request, the digital thrust request based on an autothrottle input to the autothrottle controller;

in response to obtaining the digital thrust request, terminating a manual input mode for the powerplant, the engine and the propeller, when in the manual input mode, controlled based on a power request obtained from a manual input associated with the engine;

engaging an autothrottle mode for the powerplant for controlling the engine and the propeller based on the digital thrust request rather than on the power request obtained from the manual input; and adjusting a position of the manual input with the autothrottle controller based on the digital power request for performing a transition of the powerplant out of the autothrottle mode.

20. The method of claim 19, wherein the digital thrust request comprises a digital power request and a digital rotational speed request, wherein controlling the engine and the propeller based on the digital thrust request comprises controlling the engine based on the digital power request and controlling the propeller based on the digital rotational speed request.

* * * * *